United States Patent [19]
Fujii et al.

[11] Patent Number: 5,344,627
[45] Date of Patent: Sep. 6, 1994

[54] PROCESS FOR REMOVING CARBON DIOXIDE FROM COMBUSTION EXHAUST GAS

[75] Inventors: Masumi Fujii; Taiichiro Suda; Yoshitsugu Hotta; Kenji Kobayashi, all of Osaka; Kunihiko Yoshida; Shigeru Shimojo, both of Amagasaki; Mutsunori Karasaki; Masaki Iijima, both of Tokyo; Touru Seto; Shigeaki Mitsuoka, both of Hiroshima, all of Japan

[73] Assignees: The Kansai Electric Power Co., Inc., Osaka; Mitsubishi Jukogyo Kabushiki Kaisha, Tokyo, both of Japan

[21] Appl. No.: 2,830

[22] Filed: Jan. 15, 1993

[30] Foreign Application Priority Data

Jan. 17, 1992 [JP] Japan .................................. 4-006468

[51] Int. Cl.⁵ .............................................. C01B 31/20
[52] U.S. Cl. .................................... 423/220; 423/226; 423/437 R; 55/DIG. 30; 62/11; 95/39
[58] Field of Search .......... 423/437, 220, 226, 437 M, 423/437 R; 95/39, 40; 55/268, DIG. 30; 62/4, 17, 116, 11

[56] References Cited

U.S. PATENT DOCUMENTS

| | | | |
|---|---|---|---|
| 3,683,626 | 8/1972 | Merrill | 60/279 |
| 4,206,610 | 6/1980 | Santhanam | 62/55 |
| 4,591,370 | 5/1986 | Gazzi et al. | 62/17 |
| 4,942,734 | 6/1990 | Markbreiter et al. | 60/39.02 |
| 5,133,190 | 7/1992 | Abdelmalek | 60/648 |

FOREIGN PATENT DOCUMENTS

| | | | |
|---|---|---|---|
| 0262894 | 4/1988 | European Pat. Off. | |
| 429154 | 5/1991 | European Pat. Off. | |
| 55-3348 | 1/1980 | Japan | 95/39 |
| 57-175716 | 10/1982 | Japan | 423/220 |
| 59-73415 | 4/1984 | Japan | 423/437 |
| 3-193116 | 8/1991 | Japan | |
| 4-48185 | 2/1992 | Japan | 423/437 |
| 2203674 | 10/1988 | United Kingdom | |

Primary Examiner—Gary P. Straub
Assistant Examiner—Timothy C. Vanoy
Attorney, Agent, or Firm—Jacobson, Price, Holman & Stern

[57] ABSTRACT

A process for removing carbon dioxide ($CO_2$) from a combustion exhaust gas of a boiler (1) which generates steam for driving high (3), intermediate (7), and low (8) pressure turbines. The process comprises the steps of removing $CO_2$ in the combustion exhaust gas by absorption with a $CO_2$-absorbing liquid (19), liquefying the removed $CO_2$ (28) by compression (42) and cooling (48), storing (52) the $CO_2$, and regenerating the $CO_2$-absorbing liquid by a $CO_2$-absorbing liquid regeneration column (24) equipped with a reboiler (30). In the process, a part (40) of steam discharged from the high pressure turbine (3) is used to drive turbines (41, 43) for compressors (42, 44) that compress the $CO_2$, and a refrigerant for cooling the $CO_2$, and steam (45) discharged from the compressor turbines is supplied as a heating source to the reboiler (30) for the regeneration of the $CO_2$-absorbing liquid. A decrease in the overall power plant efficiency due to the removal of carbon dioxide from the exhaust gas can be reduced.

2 Claims, 3 Drawing Sheets

PROCESS FOR REMOVING CARBON DIOXIDE FROM COMBUSTION EXHAUST GAS

BACKGROUND OF THE INVENTION

1. Field of the Invention

This invention relates to a process for efficiently removing and recovering carbon dioxide ($CO_2$) from combustion exhaust gases leaving the boilers of thermal power plants.

2. Description of the Related Art

In recent years the greenhouse effect of $CO_2$ has arrested attention as a factor contributing to the global warming. Counteracting this effect is urgently needed throughout the world so as to protect the global environment. The source of $CO_2$ is omnipresent in every area of human activities that involve combustion of fossil fuels, and the tendency is toward stricter emission control than before. In view of these, factors many studies are under way on the recovery of $CO_2$ from combustion exhaust gases, especially from those emitted by power-generating installations such as steam power plants that burn huge volumes of fossil fuels, and on the storage of the recovered $CO_2$ without releasing it to the atmosphere.

The present applicant previously proposed a process for the removal and recovery of $CO_2$ from combustion exhaust gases with less energy consumption, as illustrated in FIG. 3 (Japanese Patent Provisional Publication (Kokai) No. 3-193116).

In FIG. 3, $CO_2$-containing combustion exhaust gas from a boiler 1 is boosted to a high pressure by a boiler combustion gas fan 14 and delivered to a combustion gas cooler 15, where it is cooled with cooling water 16 and transferred to a $CO_2$-absorption column 18, while the spent cooling water 17 is discharged out of the system.

Inside the $CO_2$-absorption column 18, the combustion exhaust gas comes in countercurrent contact with regenerated $CO_2$-absorbing liquid 19 containing an alkanolamine, and through a chemical reaction the $CO_2$ in the gas is absorbed by the liquid. The gas 21 freed of $CO_2$ is discharged from the system. The absorbing liquid 20 that has absorbed $CO_2$ is sent, after pressure boost by a rich solvent pump 22, to a rich/lean solvent heat exchanger 23, where it is heated by the regenerated absorbing liquid and then supplied to a $CO_2$-absorbing liquid regeneration column 24.

At a lower portion of the regeneration column 24, the $CO_2$-absorbing liquid is heated in a reboiler 30 by low pressure steam (at an absolute pressure of 4 $kg/cm^2G$) 13 extracted from a low pressure turbine 8. $CO_2$ gas entraining steam is conducted from the top of the $CO_2$-absorbing liquid regeneration column 24 to an overhead condenser 25. A condensate of low pressure steam, condensed by the reboiler 30, is boosted by a reboiler condensing pump 32, mixed with preheated boiler feed water to raise the temperature of the feed water, and the mixture is fed to the boiler 1.

The $CO_2$ discharged, entraining by steam, from the $CO_2$-absorbing liquid regeneration column 24 preheats in the overhead condenser 25 the boiler feed water whose pressure has been boosted by the boiler feed water pump 12. The steam-entraining $CO_2$ is then cooled by an overhead cooler 26 and separated from water by a separator 27, and $CO_2$ alone is led through line 28 to another process step for recovery. The water separated by the separator 27 is pumped back to the $CO_2$-absorbing liquid regeneration column 24 by a condensing water circulating pump 29.

The regenerated $CO_2$-absorbing liquid is boosted to a high pressure by a lean solvent pump 31, cooled in the rich/lean solvent heat exchanger 23 with the absorbing liquid that has absorbed $CO_2$, cooled further by a lean solvent cooler 33, and then supplied to the $CO_2$-absorption column 18.

In the meantime steam 2 at a high pressure and high temperature that has been generated and heated by the boiler 1 is caused to drive a high pressure steam turbine 3, heated by a reheater 5 in the boiler 1 as an emission 4 from the turbine, and delivered as reheated intermediate pressure steam 6 to the low pressure turbine 8.

Part of the steam is extracted at line 13 from the low pressure section of the low pressure turbine 8 and supplied to the reboiler 30. The rest of the steam 9 exhausted from the low pressure turbine is condensed by a condenser 10, and the condensate 11 is led to the overhead condenser 25 by the boiler feed water pump 12.

Examples of alkanolamines that absorb $CO_2$ include monoethanolamine, diethanolamine, triethanolamine, methyldiethanolamine, diisopropanolamine, and diglycolamine. An aqueous solution of such a single alkanolamine or of two or more such alkanolamines is used. Usually, an aqueous monoethanolamine solution is preferred.

The above-described process reduces the power generation efficiency of a power plant compared with a plant that does not adopt the process for $CO_2$ removal, but the degree of efficiency drop can be kept low. For example, when 90% of $CO_2$ in the combustion exhaust gas from the boiler of a natural gas-fired power plant is to be removed, if the supply of heat for heating the reboiler 30 is obtained by combustion of fuel, the required fuel would amount to 18.9% of the heat of combustion in the boiler of the power plant. Consequently, the power generation efficiency for the same quantity of heat of combustion would decrease by 6.3%, from 36.4% for non-$CO_2$removal operation to 30.1% with $CO_2$ removal. According to the process proposed as above, however, steam at a pressure of 4 $kg/cm^2G$ is extracted from the low pressure steam turbine 8 to heat the reboiler 30, and the condensate of the steam can heat boiler feed water. Moreover, the heat exchange in the overhead condenser 25 between the steam-entraining $CO_2$ from the $CO_2$-absorbing liquid regeneration column and the boiler feed water renders it possible to decrease the quantity of steam extraction otherwise required to heat the boiler feed water. Thus, while the axial power of the low pressure steam turbine decreased to some extent, a drop in the power generation efficiency for the same quantity of heat of combustion could be limited to 4.5%, attaining a 1.8% improvement in the power generation efficiency over the conventional process. Also, when a combined cycle gas turbine is adopted, an improvement of 3.4% was shown to be achieved.

Although the above-described proposed process can limit the deterioration of the power generation efficiency owing to the removal and recovery of $CO_2$ to some extent, there is strong demand for more improvements which would lessen the penalty of efficiency drop further.

SUMMARY OF THE INVENTION

It is an object of the present invention to further reduce a decrease in the overall power generation efficiency due to the recovery of carbon dioxide from the combustion exhaust gas.

In view of the problem associated with the power generation with concurrent removal and recovery of $CO_2$ by absorption from the combustion exhaust gas leaving the boiler, intensive research has been made. As a result, it has now been found that the problem can be solved through an improvement in the method of securing a steam source for heating the reboiler. It is upon this basis that the present invention has just been perfected.

The present invention provides a process for removing carbon dioxide ($CO_2$) from a combustion exhaust gas of a boiler which generates steam for driving high, intermediate, and low pressure turbines, comprising the steps of removing $CO_2$ in the combustion exhaust gas by absorption with a $CO_2$-absorbing liquid, liquefying the removed $CO_2$ by compression and cooling, storing the $CO_2$, and regenerating the $CO_2$-absorbing liquid by a $CO_2$-absorbing liquid regeneration column equipped with a reboiler, wherein a part of steam discharged from the high pressure turbine being used to drive turbines for compressors that compress and cool the $CO_2$, and steam discharged from the compressor turbines being supplied as a heating source to the reboiler for the regeneration of the $CO_2$-absorbing liquid.

It is a preferred modification in this invention that, where necessary, steam extracted from the low pressure turbine is added to the steam discharged from the turbines of the compressors for $CO_2$ compression and cooling.

The invention will now be described in detail with reference to the accompanying drawings.

DETAILED DESCRIPTION OF THE PREFERRED EMBODIMENT

Figure 1:
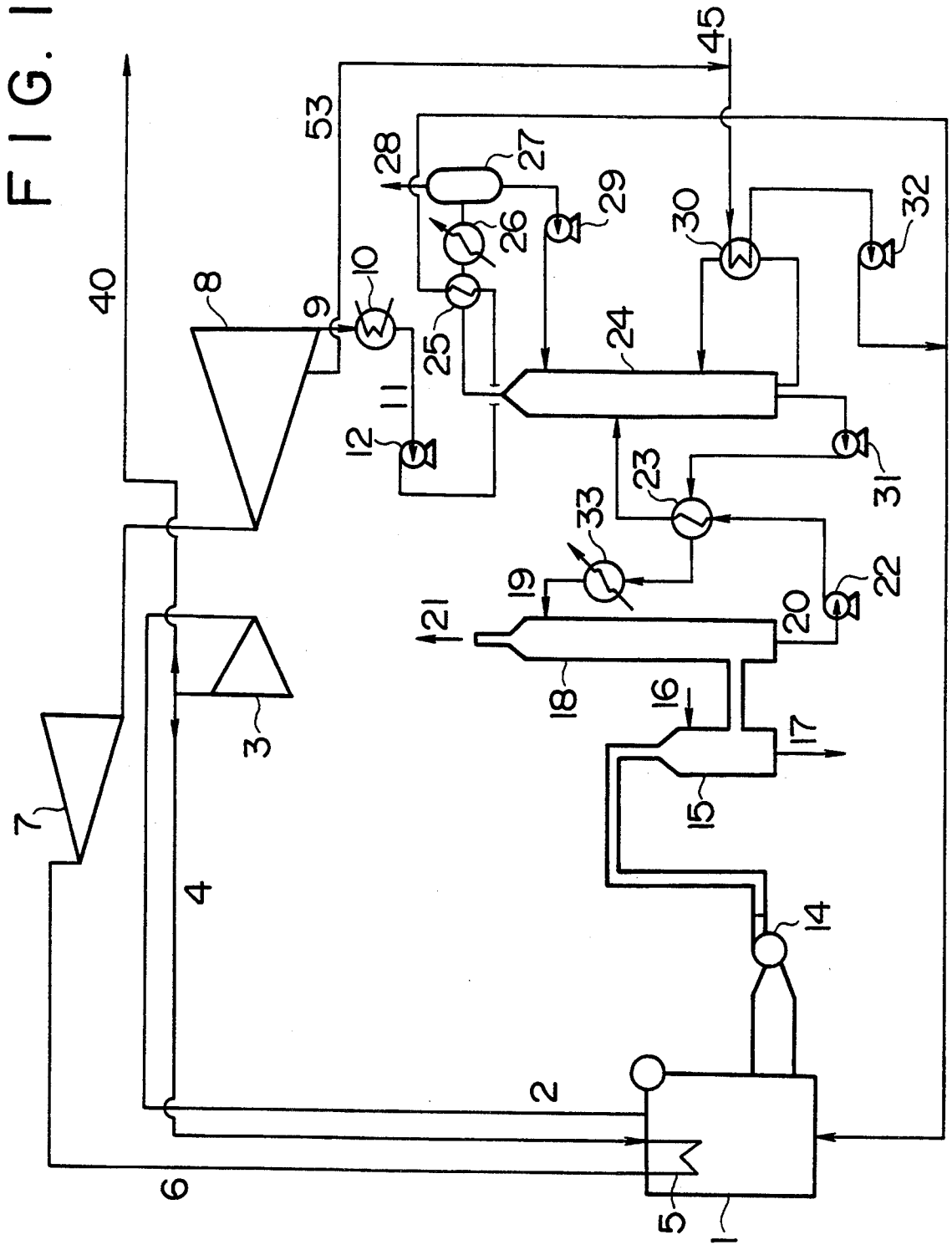
FIG. 1 is a block flow diagram illustrating the process of the invention for $CO_2$ removal (a part of two-part diagram)
Figure 2:
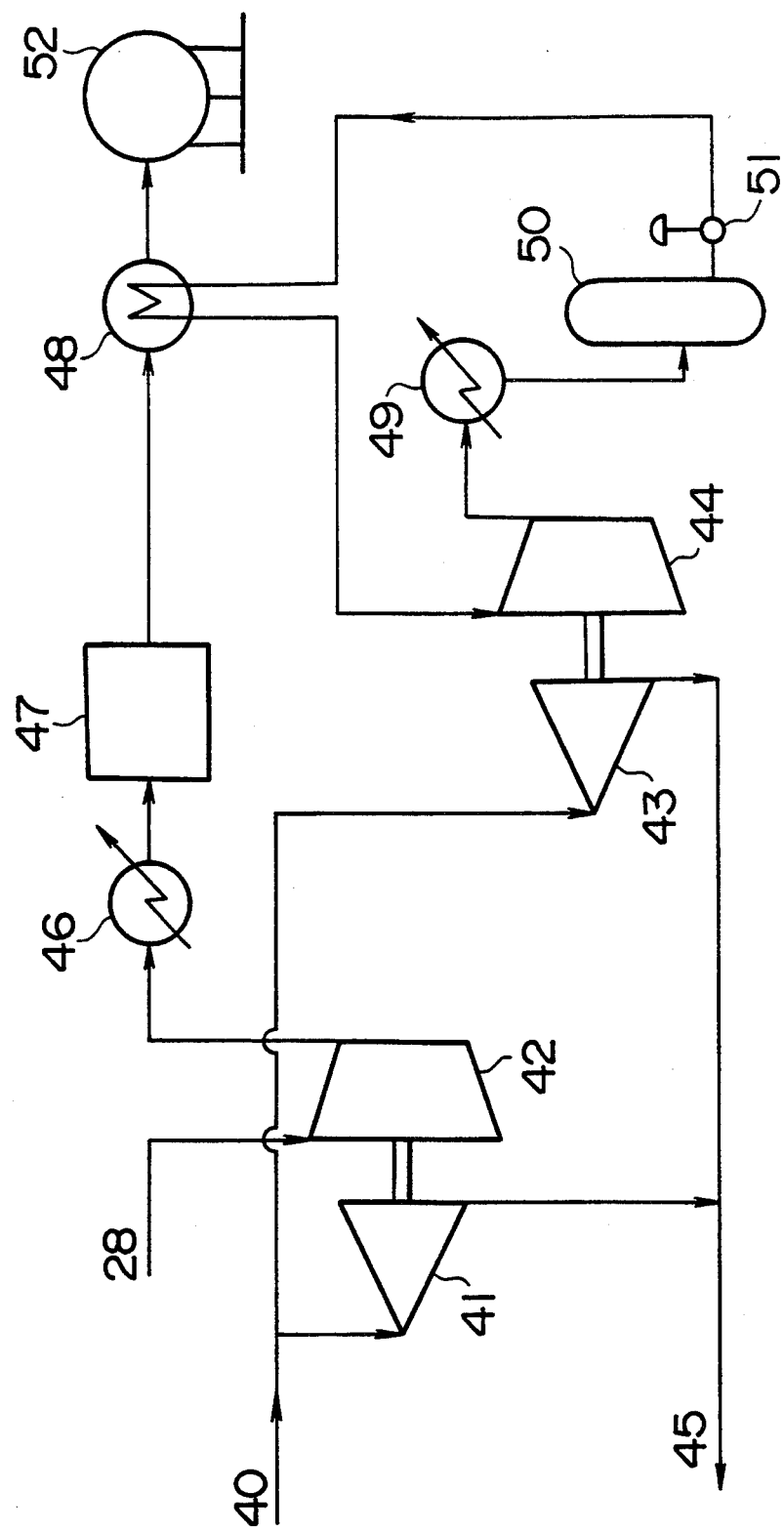
FIG. 2 is a block flow diagram illustrating the process of the invention for $CO_2$ removal (the other part)

FIGS. 1 and 2 are two parts of a block flow diagram illustrating the process of the invention for $CO_2$ removal. In these figures only major components are shown, and ancillary devices are omitted. As necessary, tanks, valves, pumps, heat exchangers, etc. are to be provided. Low, intermediate, and high pressure tanks, which are usually installed in pairs, are indicated here by single numerical values, with their associated generators omitted. Numerals like those used in FIG. 3 designate like parts in these figures.

The $CO_2$ separated from the absorbing liquid in a separator 27 in FIG. 1 is conducted through line 28 to a compressor 42 in FIG. 2, where it is compressed, and cooled by a cooler 46. It is then dehydrated in a dehydrating step 47. The dehydrated $CO_2$ is further cooled by a cooler 48 to a liquefied state and stored in a liquefied $CO_2$ tank 52. A steam turbine 43 shown in FIG. 2 is provided to drive a compressor 44 for compressing a refrigerant. The compressed refrigerant is cooled by a heat exchanger 49 and supplied to a drum 50. The refrigerant is flush cooled by a flush valve 51 and supplied to the cooler 48. Thus, in order to recover and store in a liquid state the $CO_2$ that has been removed by absorption in the process steps of FIG. 1, it is necessary to provide the compressors 42, 44 for $CO_2$ compression and cooling as shown in FIG. 2.

Under the invention, part of the steam 4 returning from the high pressure turbine 3 to the reheater 5 of the boiler 1 is utilized as a source of steam for the steam turbines that drive these compressors. For this purpose provided is a branch line 40 through which the steam is led to drive the turbines 41 and 43 in FIG. 2. The proportion of the steam 4 to the total steam supply is so set as to optimize the overall thermal efficiency of the process and usually ranges between 15 and 20%.

Another feature of the invention is the use of the steam leaving the compressor-driving turbines 41, 43 as a source of heat for the reboiler 30.

As an alternative to the heating steam source for the reboiler 30 according to the invention, it might appear possible to supply the steam exhausted or extracted from the low pressure or intermediate pressure turbine 7 to the $CO_2$-compressing or cooling turbine and then utilize the steam exhausted or extracted from such a turbine. However, a temperature of about 150° C. is high enough as a steam source for heating the reboiler 30, and the steam thus exhausted or extracted has an unnecessarily high temperature (about 260° C.). Too high a heating source temperature would raise the surface temperature of heating tubes inside the reboiler 30 and give unfavorable results such as decomposition of monoethanolamine. If such hot steam were used, it would rather be necessary to cool it, e.g., by mixing it with the condensate of a condenser installed downstream of the low pressure turbine, a practice not advisable in terms of the energy balance of the whole system. According to the process of the invention, the steam emission (about 270° C.) from the high pressure turbine is used, without reheating, in the other two (low and intermediate pressure) turbines, and the steam discharged (usually wet vapor) from the latter is utilized in the reboiler 30. Consequently, the steam has a pressure of between 3 and 4 ata and a relatively low temperature of about 140° C. It requires no cooling with the condensate from the condenser and permits effective utilization of energy.

Since the invention uses the steam discharged from the high pressure turbine as the source of heating steam for the reboiler 30, the steam pressure is relatively high and accordingly reduces the required amount of steam. This may, in an extreme case, cause a shortage of steam supply for the heating of the reboiler 30. In that case, as indicated in FIG. 1, it is desirable to use the steam 53 extracted from the low pressure turbine as the steam for heating the reboiler 30 in addition to the steam discharged by the $CO_2$-compressing or cooling compressor.

Experimental Example

Figure 3:
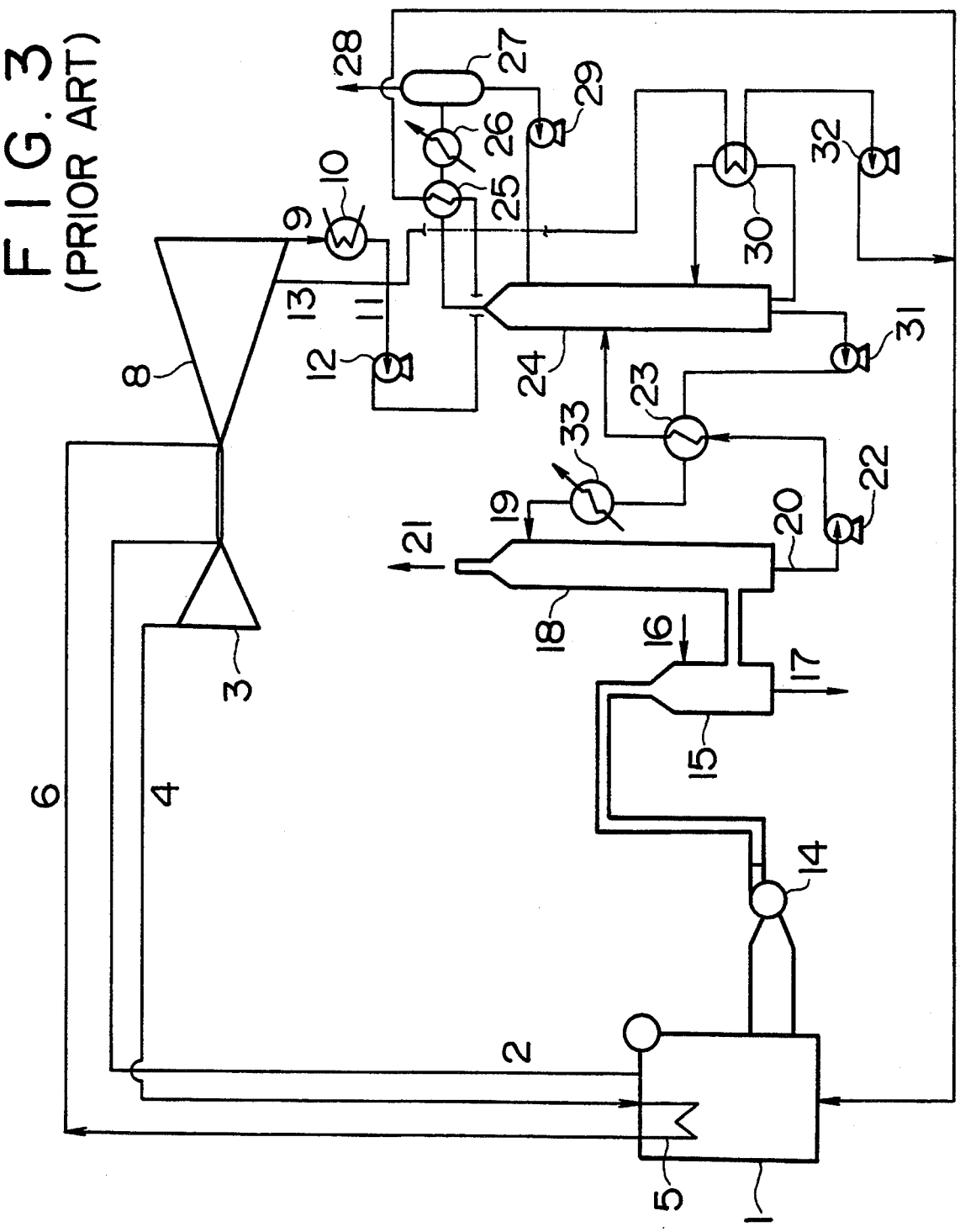
FIG. 3 is a block flow diagram illustrating a conventional process for $CO_2$ removal.

The conventional process illustrated in FIG. 3 and the process of the invention (FIGS. 1 and 2) were applied, separately, to an LNG-fired steam power plant having a generating capacity of 600,000 kW. The generated output decreased as shown in Table 1. As is clear from the table, the process of the invention makes possible an improvement in generated output by about 2%.

TABLE 1

| Itemized decreases in the power output as a result of $CO_2$ recovery and liquefaction | Process of FIG. 3, kW | Process of the invention, kW |
| --- | --- | --- |
| Output decrease due to steam extraction from low pressure turbine | 41,300 | |
| Auxiliary power requirement for $CO_2$ removal | 8,581 | 8,581 |
| Power requirement for $CO_2$ compressor | 22,300 | |
| Power requirement for $CO_2$ refrigeration compressor | 13,400 | |
| Power requirement for liquid $CO_2$ pump | 50 | 50 |
| Boiler reheater load reduction | | −35,000 |
| Combined output decrease of intermediate and low pressure turbines | | 100,000 |
| Total | 85,631 | 73,631 |
| Decrease from 600,000 kW, % | 14.27 | 12.27 |

As described above, the present invention renders it possible to lessen the decrease of power generation efficiency of a steam power plant due to the removal and recovery of $CO_2$ from the combustion exhaust gas.

We claim:

1. A process for removing carbon dioxide ($CO_2$) from a combustion exhaust gas of a boiler generating steam conducted to a first high pressure turbine, a second intermediate pressure turbine operating at a pressure lower than said first turbine, and a third low pressure turbine operating at a pressure lower than said second turbine for driving said turbines, comprising:

removing $CO_2$ in said combustion exhaust gas by absorbing said $CO_2$ in a $CO_2$-absorbing liquid;

providing a $CO_2$-absorbing liquid regeneration column having a reboiler;

conducting said $CO_2$-absorbing liquid through said absorbing liquid regeneration column for regenerating said $CO_2$-absorbing liquid;

providing a fourth turbine operatively connected to a first compressor for driving said first compressor thereby;

providing a fifth turbine operatively connected to a second compressor for driving said second compressor thereby;

conducting a part of steam discharged from said first turbine to said fourth and fifth turbines;

driving said fourth and fifth turbines by said part of steam discharged from said first turbine;

driving said first and second compressors by said fourth and fifth turbines, respectively;

conducting said removed $CO_2$ to said first compressor and compressing said removed $CO_2$ therein;

conducting said compressed $CO_2$ from said first compressor to a cooler;

passing a refrigerant through said second compressor and through said cooler for cooling and liquifying said compressed $CO_2$;

storing said liquified $CO_2$; and conducting steam discharged from said first and second compressor turbines to said reboiler as a heating source for said reboiler for regeneration of said $CO_2$-absorbing liquid.

2. The process as claimed in claim 1 and further comprising:

extracting steam from said third turbine; and conducting said extracted steam from said third turbine to said reboiler together with said steam discharged from said fourth and fifth turbines and conducted to said reboiler.

* * * * *